United States Patent [19]

Zimmerly

[11] Patent Number: 5,152,320
[45] Date of Patent: Oct. 6, 1992

[54] REVERSE-ACTING DIVERTER VALVE
[75] Inventor: Robert D. Zimmerly, Kenosha, Wis.
[73] Assignee: Tri-Clover, Inc., Kenosha, Wis.
[21] Appl. No.: 817,050
[22] Filed: Jan. 6, 1992
[51] Int. Cl.⁵ ............................................ F16K 11/048
[52] U.S. Cl. .................................. 137/625.5; 137/312; 137/625.48
[58] Field of Search ................ 137/625.5, 625.27, 312, 137/625.48

[56] References Cited
U.S. PATENT DOCUMENTS

| | | | |
|---|---|---|---|
| 3,779,280 | 12/1973 | Evans et al. | 137/625.5 |
| 3,902,526 | 9/1975 | Brake et al. | 137/625.5 X |
| 4,924,911 | 5/1990 | Schmalenbach | 137/625.5 |

Primary Examiner—Arnold Rosenthal
Attorney, Agent, or Firm—Fuller, Ryan, Hohenfeldt & Kees

[57] ABSTRACT

A diverter valve for controlling a fluid flow without the sudden hammering pressure changes normally found in fluid control systems, and a method for assembling the valve. The valve includes a modular valve body with two substantially identical sections, each with a valve seat, oppositely arranged. The valve body also includes a T-shaped connecting section connected between the end openings of the two other sections. A valve stem shaft in the valve body has a two valve plugs facing together, with the two valve seats between the valve plugs, so that each valve plug moves against the flow of the fluid to a closed position. A valve actuator shifts the valve stem shaft axially between first and second positions so that first one plug is closed, and then the other. The second valve plug is removably attached to the shaft by means of a tube connected to the second valve plug. This tube slides over one end of the valve stem shaft until it contacts a shoulder, and attaches to the valve stem shaft in that position. The end onto which the tube is slid is threaded, and a nut is applied to threads after the tube is applied to the shaft. The tube has openings for permitting any leakage between the second valve plug and the shoulder to be easily detected.

15 Claims, 2 Drawing Sheets

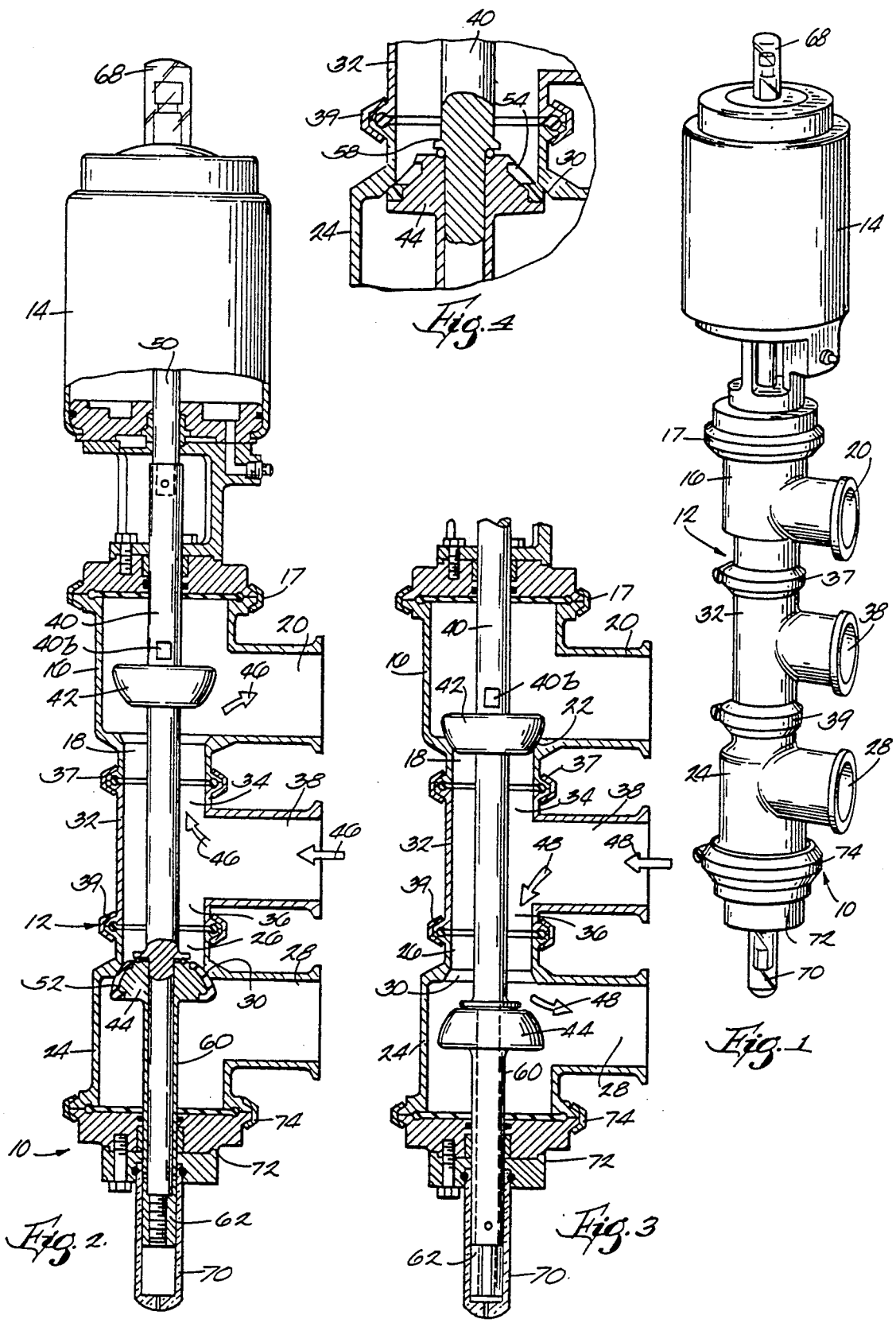

REVERSE-ACTING DIVERTER VALVE

BACKGROUND OF THE INVENTION

This invention relates to valve assemblies and valve stems, and in particular to valves the construction of which are optimized to reduce the sudden changes in pressure caused by routine mechanical opening and closing of the valves.

It is well known that the closing of a valve in the same direction as the flow of the fluid being controlled results in much more sudden and violent closure than closing of the valve against the flow. For this reason, conventional shut-off valves have been constructed and arranged this way for quite some time.

With respect to divert valves, though, with the normal arrangement where the inlet is in the center and the two outlets are disposed one above and one below the inlet, or one on each side, it has been conventional to close the valve in the same direction as the flow, as shown in Catalog No. AFC-90 published by Tri-Clover, Inc. The reason for this direction of closure for divert valves is that the two plugs, both affixed to the valve stem, prevent assembly of the valve if arranged any other way.

However, the sudden changes in pressure caused by closing valves in this manner can cause damage to a wide range of system components, ranging from pipe hangers to pumps and the clamps connecting the systems together. Alternatively, the avoidance of this hammering leads to otherwise unnecessarily low limits on the pressures, velocities and other capacities of the systems affected.

This invention relates to improvements to the apparatus described above and to solutions to some of the problems raised or not solved thereby.

SUMMARY OF THE INVENTION

The invention relates to a diverter valve for controlling a fluid flow comprising a valve body which has an inlet port and two outlet ports, and a valve seat for each of the two outlet ports. Each of the valve seats has a valve plug mating surface. A valve stem shaft is disposed within the valve body. The valve stem shaft has a first valve plug disposed within the valve body and arranged to mate with one of the valve seats when the valve stem shaft is in a first position wherein that plug is closed against its respective seat. The first valve plug thus moves against the flow of the fluid to its closed position. A second valve plug is also attached to the valve stem shaft and arranged to mate with the other valve seat when the valve stem shaft is in a second position, wherein that plug is closed against its seat. The second valve plug also moves against the flow of the fluid to its closed position. Means, such as a valve actuator, are included for shifting the valve stem shaft axially within the valve body between the first and second positions. The valve plugs are positioned on the valve stem shaft so that the valve seats are between the valve plugs. The second valve plug is removably attached to the shaft, such as by threaded fastening means, by means of a tube connected to the second valve plug. This tube is slidable over one end of the valve stem shaft and attachable to the valve stem shaft in that position. A shoulder is provided on the shaft between the first valve plug and the end of the valve stem shaft onto which the tube is slid, and the tube is slid onto the valve stem shaft until it contacts the shoulder. The end onto which the tube is slid is threaded, and a nut is applied to threads after the tube is applied to the valve stem shaft.

In one embodiment the valve body comprises two substantially identical sections, an upper section and a lower section, each section having a side opening and an end opening, and a valve seat formed in connection with the end opening. These two sections are oppositely arranged, with the end opening of each section facing the other section. The valve body also includes a T-shaped connecting section linked between the end openings of the two other sections. The connecting section has three openings, two of which are substantially co-linearly aligned and the third of which is non-aligned. The end opening of each of the first two sections is connected to one of the aligned openings of the T-shaped section.

The invention also includes a novel method of assembling a valve, including building a valve body assembly out of two valve bodies substantially identical to each other, each having an inlet and an outlet. A T-shaped connector is provided with two outlets for connecting to the two inlets of the valve bodies in fluid communication. Each of the two valve bodies has a valve plug mating surface, or valve seat, for its outlet port. When the valve body assembly is complete, the valve seat of each valve body faces away from the valve seat of the opposite valve body. A valve stem shaft, having a first valve plug positioned on the shaft in spaced relation to both ends of the shaft, is inserted into the valve body assembly until the first valve plug contacts, or nearly so, the valve seat of the first valve body. After the valve stem shaft is inserted into the valve body, a second valve plug is slid onto the valve stem shaft so that the two valve seats are between the two valve plugs. The second plug is then affixed in that position, such as by a threaded fastener.

Other objects and advantages of the invention will become apparent hereinafter.

DESCRIPTION OF THE DRAWING

FIG. 1 is an isometric view of a valve assembled according to a preferred embodiment of the invention.

FIG. 2 is a side elevational view of the valve shown in FIG. 1, shown partially cut away, with the valve stem in the position where the fluid is directed toward the upper outlet.

FIG. 3 is a fragmentary side elevational view of the valve shown in FIG. 1, shown partially cut away, with the valve stem in the position where the fluid is directed toward the lower outlet.

FIG. 4 is a fragmentary side elevational view of a portion of the valve shown in FIG. 1, with a different embodiment of valve stem gasket.

DESCRIPTION OF THE PREFERRED EMBODIMENT

Figure 5:
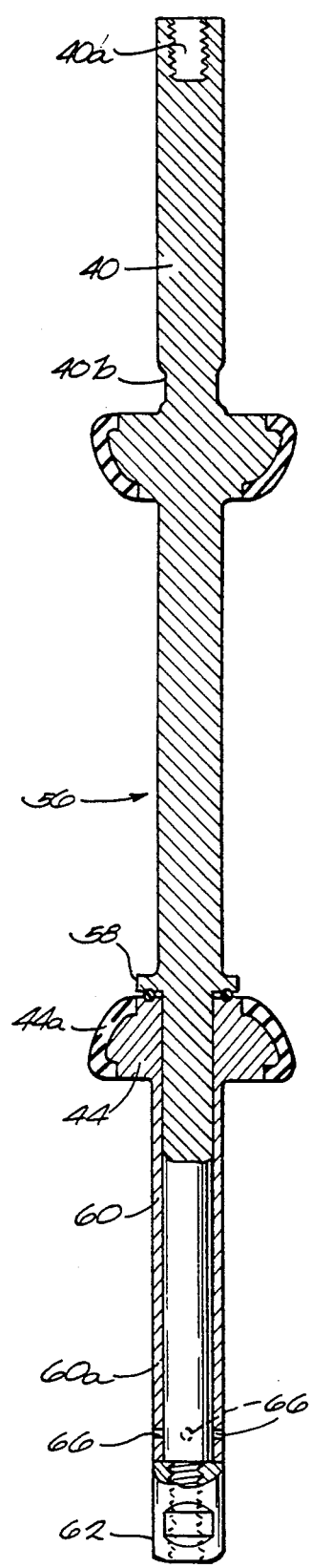
FIG. 5 is a cross-sectional view of a valve stem constructed according to a preferred embodiment of the invention.

Referring now to FIG. 1, there is shown a diverter valve 10 constructed according to a preferred embodiment of the invention. As there shown, diverter valve 10 is constructed of a valve body assembly 12, with a valve actuator 14 connected to the top end of the valve body assembly.

Throughout this description and the appended claims there will be directional references, such as "upper", "lower", "top", "bottom", "left" and "right". These directional references refer only to the orientation of the structure shown in the drawing figures, and are for reference only. They are not intended to limit in any way the claims to the invention.

As can be seen by comparing FIG. 1 to FIG. 2, the invention calls for the valve body assembly 12 to be formed of several sections An upper or first valve body 16 is attached to the valve actuator 14 by suitable removable means such as a clamp 17. First valve body 16 includes an inlet 18, generally in line with and facing away from the valve actuator 14, and an outlet 20 transverse to the inlet 18. First valve body 16 includes an upper or first valve seat 22 generally in proximity with its inlet 18.

The valve body assembly 12 also includes a lower or second valve body 24, which is substantially identical to first valve body 16, but oriented substantially opposite. That is, second valve body 24 includes an inlet 26, generally in line with and facing toward the valve actuator 14, and an outlet 28 transverse to the inlet 26. Second valve body 24 also includes a lower or second valve seat 30 generally in proximity with its inlet 26.

The valve body assembly 12 further includes a T-shaped connecting section or tee body 32, affixed between the inlet 18 of first valve body 16 and the inlet 26 of second valve body 24. Each of those two inlets 18, 26 is in fluid communication with a respective outlet 34 and 36 of tee body 32. And tee body 32 has its own inlet 38. In the embodiment shown in the drawing figures the two outlets 34, 36 are substantially co-linearly aligned, and the inlet 38 of which is transverse, or at least not aligned with the outlets. Tee body 32 is connected to first valve body 16 and second valve body 24 by suitable removable means such as clamps 37 and 39 respectively.

Hence the assembled valve body assembly 12 provides a substantially straight path through the first valve body 16, the tee body 32 and the second valve body 24. According to the invention, into this assembled valve body assembly 12 is inserted a valve stem shaft 40. In the embodiment shown in the drawing figures, the valve stem shaft 40 includes or has affixed thereto an upper or first valve plug 42, which is configured and constructed to mate with first valve seat 22 of first valve body 16. The valve stem shaft 40 is inserted to the valve body assembly 12 from the top, until first valve plug 42 contacts, or almost contacts, first valve seat 22. Then a lower or second valve plug 44, configured and constructed to mate with second valve seat 30 of second valve body 24, is inserted to the valve body assembly 12 from the bottom, until second valve plug 44 contacts, or almost contacts, second valve seat 30. With the spacing between the valve plugs 42, 44 somewhat greater than the spacing between the valve seats 22, 30, the second valve plug 44 is attached to the valve stem shaft 40.

As can be seen from a comparison of FIGS. 2 and 3, valve stem shaft 40 is moved between an upper position, permitting the controlled fluid to flow out the first valve body outlet 20, as indicated by arrows 46 (FIG. 2), and a lower position, permitting the controlled fluid to flow out the second valve body outlet 28, as indicated by arrows 48 (FIG. 3). This movement of valve stem shaft 40 is accomplished by a valve actuator rod 50, connected such as to the end of the valve stem shaft closer to the first valve plug 42. As shown in FIG. 5, the means by which the valve stem shaft 40 is attached to the actuator rod 50 may be to form and tap a blind hole 40a in the end of the valve stem shaft, and attach it by threading to a matching end of the actuator rod.

While FIGS. 2 and 3 show valve plugs 42 and 44 with rubber gaskets 52, as shown in FIG. 4, harder gaskets 54 such as the ones shown in U.S. Pat. No. 4,531,532 may be used for one or both plugs as well. The disclosure of that patent is incorporated herein by reference in its entirety.

Figure 6:
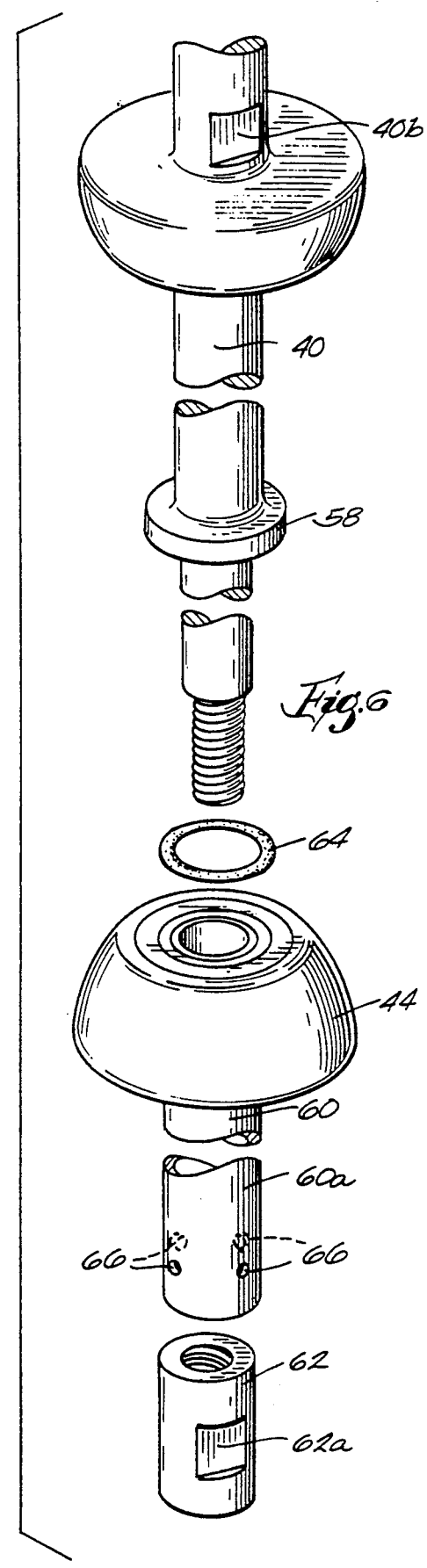
FIG. 6 is an exploded isometric view of the valve stem shown in FIG. 5.

FIGS. 5 and 6 show a preferred embodiment for attaching the second valve plug 44 to the valve stem shaft 40, to arrive at an assembled valve stem 56. As there shown, the valve stem shaft 40 includes stop means such as a flange or shoulder 58 formed on the shaft at the position where the second valve plug 44 is to be located. In this embodiment, the second valve plug 44 is formed with or attached to a tube 60, which extends in a direction away from the valve seat face 44a of the plug intended to contact the valve seat. The tube 60 carrying second valve plug 44 is slid onto the end of the valve stem shaft 40 until the plug contacts the shoulder 58. The length of the tube 60 is determined so that the end 60a opposite that of second valve plug 44 is just shorter than valve stem shaft 40 itself. In the embodiment shown the tube 60 is then fixed in place on valve stem shaft 40 by affixing a nut 62 to the end of the shaft, trapping the tube and second valve plug 44 in place. Flat surfaces 40b and 62a respectively may be provided on the valve stem shaft 40 and the nut 62 to assist in tightening the nut in place.

In order to secure a tight seal of the tube 60 to the valve stem shaft 40, an O-ring 64 may be provided between the two parts. In any case, since a prime application of the valve incorporating this valve stem 56 is for sanitary uses such as food processing, it is important to have an indication of any leakage at this point of connection. Since, as shown in FIGS. 1 and 2, this point is located deep within the valve body assembly 12, means of showing leakage are provided. One or more small openings 66 are formed in the tube, in proximity to the end 60a thereof, so as to permit any leaked fluid to exit at that point.

Referring back to FIGS. 1 and 2, it is known to provide a clear tubule 68 at the top of the actuator 14, so that a portion 50a of the actuator rod 50 can protrude above the housing, resulting in there being an indication of the current position of the valve stem 56. If the valve stem 56 is in the upper position as shown in FIG. 2, the top actuator rod portion 50a will be more visible and raised within tubule 68, whereas if the valve stem 56 is in the lower position as shown in FIG. 3, the top actuator rod portion 50a will be less visible and lower inside tubule 68.

Similar in a sense to tubule 68, a leak indicator tubule 70 is provided, connected to an end cap assembly 72 which in turn is clamped by a clamp 74 to the bottom of the second valve body 24. The leak indicator tubule 70 is of course aligned with the valve stem 56, and the valve stem projects into the tubule at least when the valve stem is in its lower position as shown in FIG. 3. In either position, however, any leakage of fluid between second valve plug 44 and shoulder 58, and hence down the tube 60 along the valve stem shaft 40 would escape via the openings 66 and into the leak indicator tubule 70, giving clear indication of the leakage.

While the apparatus hereinbefore described is effectively adapted to fulfill the aforesaid objects, it is to be understood that the invention is not intended to be limited to the specific preferred embodiment of reverse-acting diverter valve set forth above. Rather, it is to be taken as including all reasonable equivalents within the scope of the following claims.

I claim:

1. A diverter valve for controlling a fluid flow comprising:
    a valve body assembly including at least one inlet port, at least two outlet ports, and a valve seat for each of two of said outlet ports, said valve seats having valve plug mating surfaces;
    a valve stem shaft disposed within said valve body assembly;
    a first valve plug on said valve stem shaft disposed within said valve body assembly and arranged to mate with one of said valve seats when said valve stem shaft is in a first position, and to move to that position against the flow of the fluid;
    a second valve plug attached to said valve stem shaft and arranged to mate with the other of said valve seats when said valve stem shaft is in a second position, and to move to that position against the flow of the fluid;
    means for shifting said valve stem shaft axially within said valve body assembly between said first and second positions;
    said valve body assembly comprising two substantially identical valve bodies, a first valve body and a second valve body, each valve body having an inlet opening and an outlet opening, said two valve bodies oppositely arranged, with the inlet openings of each valve body facing the other valve body, each said valve body including a valve seat formed in connection with its inlet opening, and further comprising a tee body connected between said inlet openings.

2. A diverter valve as recited in claim 1 wherein said valve plugs are positioned on said valve stem shaft so that said valve seats are between said valve plugs.

3. A diverter valve as recited in claim 1 wherein said second valve plug is attached to said shaft by threaded fastening means.

4. A diverter valve as recited in claim 1 wherein said shifting means is connected to a first end of said valve stem shaft, and further comprising a tube connected to said second valve plug, said tube slidable over a second end of said valve stem shaft and attachable in that position to said valve stem shaft.

5. A diverter valve as recited in claim 4 further comprising stop means on said shaft between said first valve plug and said second end of said valve stem shaft, said tube slidable onto said valve stem shaft until it contacts said stop means.

6. A diverter valve as recited in claim 5 wherein said second end includes threaded connection means, and further comprising a nut applicable to said threaded connection means when said tube is slid onto said valve stem shaft and contacts said stop means.

7. A diverter valve as recited in claim 1 wherein said valve body assembly comprises two substantially identical valve bodies, a first valve body and a second valve body, each valve body having an inlet opening and an outlet opening.

8. A diverter valve as recited in claim 7 wherein said two valve bodies are oppositely arranged, with the inlet openings of each valve body facing the other valve body.

9. A diverter valve as recited in claim 1 wherein said tee body is T-shaped with three openings, two of which are substantially co-linearly aligned and the third of which is non-aligned.

10. A diverter valve as recited in claim 9 wherein said inlet opening of each valve body is connected to one of said outlet openings of said tee body.

11. A valve stem assembly comprising:
    a valve stem shaft;
    attaching means at a first end of said shaft for attaching said shaft to a valve actuator;
    a first valve plug positioned on said shaft in spaced relation to both ends of said shaft;
    a second valve plug removably attached to said shaft between said first valve plug and a second end of said shaft;
    a tube connected to said second valve plug, said tube slidable over said second end of said valve stem shaft and attachable in that position to said valve stem shaft; and
    means for permitting any fluid leaking into any space between said valve stem shaft and said tube to escape, thus providing externally visible evidence of any such leakage;
    wherein said permitting means includes one or more openings formed in said tube in proximity to said second end, so as to permit any leaked fluid to escape via at least one of said one or more openings.

12. A valve stem assembly as recited in claim 11 wherein said second valve plug is attached to said shaft by threaded fastening means.

13. A valve stem assembly as recited in claim 11 further comprising stop means on said shaft between said first valve plug and said second end of said valve stem shaft, said tube slidable onto said valve stem shaft until it contacts said stop means.

14. A valve stem assembly as recited in claim 13 further comprising sealing means positioned between said stop means and said second valve plug, for reducing leakage into the space between said valve stem shaft and said tube.

15. A valve stem assembly as recited in claim 14 wherein said second end includes threaded connection means, and further comprising a nut applicable to said threaded connection means when said tube is slid onto said valve stem shaft and contacts said stop means.

* * * * *